United States Patent
Shimada

(10) Patent No.: US 9,063,377 B2
(45) Date of Patent: Jun. 23, 2015

(54) LIQUID CRYSTAL DISPLAY DEVICE

(75) Inventor: Shinji Shimada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 13/697,039

(22) PCT Filed: Jan. 18, 2011

(86) PCT No.: PCT/JP2011/050728
§ 371 (c)(1),
(2), (4) Date: Nov. 9, 2012

(87) PCT Pub. No.: WO2011/142144
PCT Pub. Date: Nov. 17, 2011

(65) Prior Publication Data
US 2013/0057792 A1    Mar. 7, 2013

(30) Foreign Application Priority Data

May 11, 2010    (JP) .................................. 2010-109600

(51) Int. Cl.
*G02F 1/1337*    (2006.01)

(52) U.S. Cl.
CPC ................................ *G02F 1/133753* (2013.01)

(58) Field of Classification Search
CPC ............ G02F 1/1337; G02F 1/133788; G02F 1/133753; G02F 2001/133742; G02F 1/13378; G02F 2001/133773; G02F 2001/133746; G02F 2001/133757; G02F 1/133707; G02F 1/1393; G02F 2001/13712
USPC .................. 349/123, 128, 129, 130
See application file for complete search history.

(56) References Cited

U.S. PATENT DOCUMENTS

| | | | |
|---|---|---|---|
| 6,690,441 B2 * | 2/2004 | Moriya | 349/130 |
| 7,057,698 B2 * | 6/2006 | Chung et al. | 349/141 |
| 2001/0001567 A1 | 5/2001 | Lyu et al. | |
| 2001/0028414 A1 | 10/2001 | Lyu et al. | |
| 2005/0062923 A1 | 3/2005 | Lyu et al. | |

(Continued)

FOREIGN PATENT DOCUMENTS

| | | |
|---|---|---|
| JP | 8-43826 | 2/1996 |
| JP | 10-333170 | 12/1998 |

(Continued)

OTHER PUBLICATIONS

International Search Report for PCT/JP2011/050728, mailed Feb. 22, 2011.

*Primary Examiner* — Edward Glick
*Assistant Examiner* — David Chung
(74) *Attorney, Agent, or Firm* — Nixon & Vanderhye P.C.

(57) ABSTRACT

The present invention provides a liquid crystal display device which is excellent in uniformity of visual angles even when divided alignment regions are distorted due to an external pressure such as pressing pressure. The present invention provides a liquid crystal display device comprising: a pair of substrates; and a liquid crystal layer between the substrates, wherein, as viewed in a plan view of a main surface of one of the substrates, the liquid crystal display device has an alignment division pattern in which each pixel is divided into four or more alignment regions, and each set of a plurality of pixels constitutes one unit, and each of the units of the alignment division pattern comprises, in at least one pixel, an alignment region whose alignment direction is different from alignment directions of alignment regions which are located at same vertical and horizontal positions in the other pixels.

5 Claims, 9 Drawing Sheets

(56) References Cited

U.S. PATENT DOCUMENTS

| | | |
|---|---|---|
| 2006/0114402 A1 | 6/2006 | Lyu et al. |
| 2007/0222931 A1 | 9/2007 | Chang et al. |
| 2008/0007665 A1 | 1/2008 | Lyu et al. |
| 2009/0279044 A1 | 11/2009 | Hakoi et al. |
| 2011/0181823 A1 | 7/2011 | Hakoi et al. |
| 2011/0285948 A1 | 11/2011 | Hakoi et al. |

FOREIGN PATENT DOCUMENTS

| | | |
|---|---|---|
| JP | 11-352486 | 12/1999 |
| JP | 2007-256906 | 10/2007 |
| JP | 2009-517697 | 4/2009 |

\* cited by examiner

LIQUID CRYSTAL DISPLAY DEVICE

This application is the U.S. national phase of International Application No. PCT/JP2011/050728, filed 18 Jan. 2011, which designated the U.S. and claims priority to Japan Application No. 2010-109600, filed 11 May 2010, the entire contents of each of which are hereby incorporated by reference.

TECHNICAL FIELD

The present invention relates to a liquid crystal display device. More specifically, the present invention relates to a liquid crystal display device which can be designed in any of various display modes, in particular, in a VA mode in which liquid crystal molecules are aligned vertically to substrate surfaces when no voltage is applied, and which is configured to have pixels each of which is divided into a plurality of regions of different alignments, so as to exhibit satisfactory features such as a wide viewing angle, and is used as a panel, to the surface of which pressing force by a finger or the like is applied.

BACKGROUND ART

Liquid crystal display devices (hereinafter, also referred to as LCDs) have become very popular because they can be designed as light, thin, less power-consuming display devices. They are used in applications, essential for our daily life and business, including mobiles, various monitors, and large-scale televisions. LCDs are still under development to provide a wider viewing angle and improved contrast, that is, to further improve display quality, and to provide one having more functions.

Current LCDs are configured to produce images by controlling the alignment of liquid crystal molecules in response to an electric field applied thereto in such a manner to change the polarization of light passing through the liquid crystal layer, thereby adjusting the amount of light passing through a polarizer.

The display quality of LCDs depends on the alignment of liquid crystal molecules to which a voltage is being applied, and the magnitude and direction of an electric field applied thereto. Various display modes of LCDs are categorized based on the alignment of liquid crystal molecules to which no voltage is being applied, and the electric field direction.

For example, a TN (Twisted Nematic) mode is a mode of liquid crystal elements in which liquid crystal molecules are twisted. Liquid crystal display devices of this mode can be driven by a low voltage and produced at low cost. Another example is a vertical electric field mode which is a mode of liquid crystal elements in which the liquid crystal alignment is vertical to substrates when no voltage is applied, and is called "VA (Vertical Alignment) mode". The VA mode is a mode advantageous in terms of high contrast, and is used in growing applications. Various techniques have been developed to satisfy all of desired features including a wide viewing angle, high contrast, and high-speed response in these modes. One notable example of current important techniques in this field is an alignment division technique to divide each pixel into regions such that liquid crystal molecules within each pixel are aligned in different directions. This technique improves display quality. In particular, an MVA (Multi-Domain Vertical Alignment) mode which can provide an excellent wide viewing angle due to its alignment division pattern described above is attracting attention.

One example of a VA mode with a conventional alignment division pattern is a VA mode (hereinafter, also referred to as VATN (Vertical Alignment Twisted Nematic) mode) in which two substrates are respectively provided with vertical alignment films for alignment control in directions perpendicular to each other so that liquid crystal molecules are twisted. One example thereof that has been disclosed so far is a liquid crystal electric optical device which is provided with a pair of substrates on the both side of a liquid crystal layer made of a negative dielectric anisotropy liquid crystal material which becomes a nematic layer at least in a predetermined temperature range, and further provided, on the surfaces of the substrates facing the liquid crystal layer, with alignment films which align liquid crystal molecules substantially vertically to the substrate surfaces when no voltage is applied, wherein each of the alignment films on the substrates is divided into two or more alignment regions in each of which the liquid crystal molecules are slightly tilted in a different pretilt direction from the direction perpendicular to the substrate surfaces, and the substrates are assembled together such that the boundary between the alignment regions of one of the substrates runs across the boundary between the alignment regions of the other substrate (see, for example, Patent Literature 1).

In addition to the example of the VA mode, there have been proposed liquid crystal display devices of a common TN mode with an alignment division pattern in which liquid crystal molecules are aligned horizontal when no voltage is applied. One example thereof which has been disclosed so far is a multi-pixel liquid crystal display device comprising two facing substrates each provided with an electrode and a liquid crystal alignment film, and a nematic liquid crystal therebetween, wherein pixels are arranged as a matrix and each are divided into regions which differ in visual angle direction of liquid crystal molecules such that the visual angle directions of lower regions of pixels in any row are the same as the visual angle directions of upper regions of pixels in the next row, and the visual angle directions of lower regions of pixels in any column are the same as the visual angle directions of lower regions of pixels in the next column (see, for example, Patent Literature 2).

Additionally, methods for producing liquid crystal display devices with such conventional alignment division patterns have also been proposed such as a method for producing a liquid crystal display device comprising a first substrate, a second substrate facing the first substrate, a liquid crystal layer between the substrates, a first alignment film provided on the liquid crystal layer side surface of the first substrate, and a second alignment film provided on the liquid crystal layer side surface of the second substrate, wherein the production method comprises subjecting the first alignment film and/or the second alignment film to scanning exposure continuously over a plurality of pixels, the scanning exposure comprising exposing the first alignment film and/or the second alignment film while scanning an inside of each pixel more than one time in antiparallel directions to form, in the each pixel region, regions in which liquid crystal molecules are aligned in antiparallel directions to the surface (s) of the first alignment film and/or the second alignment film (see, for example, Patent Literature 3).

CITATION LIST

Patent Literature

Patent Literature 1: JP 11-352486 A
Patent Literature 2: JP 8-43826 A
Patent Literature 3: JP 2009-517697 T

SUMMARY OF INVENTION

Technical Problem

As described above, display panels with alignment division patterns have been studied to improve display quality.

The LCD of Patent Literature 1 is designed based on a basic principle of 4 DRTN (4 Domain Reverse Twisted Nematic) mode liquid crystal display devices in which each pixel is divided into four alignment regions of different alignments. Patent Literature 2 defines the positional relationship between the divided regions and the pixels in the common TN alignment division pattern.

FIG. 8 is a schematic pixel plan view of a pixel of a common 4 DRTN mode liquid crystal display device, and shows the alignment division pattern in the pixel. The white dot arrows indicate the alignment directions of the lower substrate, that is, indicate that liquid crystal molecules are slightly tilted towards the arrow tips. The solid-line, white arrows indicate the alignment direction of the upper substrate. The black arrows indicate visual angle directions. FIG. 9 shows the TN alignment division pattern that divides each pixel into an upper region and a lower region of Patent Literature 2. The arrows are defined as described above for FIG. 8.

Their application has recently extended to mobiles and the like, and they are increasingly used as panels which are touched or pressed with a finger or the like, that is, as panels to the surface of which force such as external stress is applied. Such high-quality liquid crystal display devices with alignment division patterns as described above are also required to stably show high performance in this application.

For example, a 4 DRTN mode LCD, which has a small pretilt difference among domains, loses the uniformity of visual angle directions when strong force is applied to the panel surface with a finger or the like because the force moves the regions of different alignments (alignment regions), however.

Such 4 DRTN mode liquid crystal display devices are generally designed such that four domains of each pixel electrode have the same area and arranged symmetrically. This design allows these display devices to exhibit their proper display performance; however, once the area ratio is disturbed by external force, this wide viewing angle design is changed, resulting in non-uniform visual angle directions.

Specifically, a conventional product has four symmetric domains having the same area in each pixel, and its intact structure has visual angle directions indicated by the black arrows and alignment regions shown in FIG. 10. This structure is changed to that shown in FIG. 11 by an external stress 79s such as pressing force. The regions of different visual angle directions in each pixel are distorted in predetermined directions around the pressed point such that the visual angle directions of a certain area become non-uniform. The same will happen in those shown in FIGS. 8 and 9.

The present invention was made in view of the above-described background and aims at providing a liquid crystal display device with an alignment division pattern which can satisfy a wide viewing angle, and provides excellent display quality and exhibits features including uniformity of visual angle directions even when divided alignment regions are distorted by an external stress such as pressing force.

Solution to Problem

The present inventor has studied various techniques to prevent effects of external stresses such as pressing force on the display quality of liquid crystal display devices in which each pixel is divided into regions of different alignments, and found that regarding the positions in the vertical and horizontal directions of regions of different alignments in each pixel, when an external stress such as pressing force is applied, alignment regions in pixels located in the same direction from the pressed point undergo the same area change. The following is described based on FIG. 11. When an external stress is applied to the point on the upper left corner of the pixel of the figure, in each of pixels which are located downward to the right from the pressed point, the area of the upper left alignment region (the region of 71a in the pixel of FIG. 11) increases, and the area of the other alignment regions (the total area of the lower left, upper right and lower right alignment regions) decreases. In this case, the area of the lower right alignment region of each pixel (the region of 71c in the pixel of FIG. 11) is minimized. The term "alignment regions" of each pixel refers to divided regions of the pixel in each of which liquid crystal molecules are aligned in the same alignment direction, and the visual angle of each of which is uniform. Thus, it was found that the uniformity of the visual angle directions is impaired by such a change in the area of the alignment regions of each pixel caused by an external stress such as pressing force. The present inventor, however, has found ways to overcome this problem. One example thereof is a four-direction domain structure in which each of units consists of four pixels unlike conventional products in which a region corresponding to a pixel electrode is divided into four symmetrical domains having the same area. This structure can maintain the area ratio of the domains substantially constant even when external force is applied, and thereby ensures the uniformity of visual angle directions. Thus, the present inventor found that this structure can solve the above-mentioned problem and completed the present invention.

This is a modified example of the combination of the above-mentioned two conventional techniques (the 4 DRTN mode liquid crystal display device of Patent Literature 1 and the positional relationship between divided regions and pixels in the TN alignment division of Patent Literature 2), in other words, a technique that enables the concepts of these two techniques to be applied to four-direction, multi-domain liquid crystal display devices and vertical alignment liquid crystal display devices. In the present invention, the area and visual angle direction of alignment regions are designed for each unit which consists of a plurality of pixels although alignment regions of all pixels in the conventional structure are designed such that alignment regions located at corresponding positions in the vertical and horizontal directions in the respective pixels have the same area and the same alignment direction.

Specifically, the present invention provides a liquid crystal display device comprising:
a pair of substrates; and
a liquid crystal layer between the substrates,
wherein, as viewed in a plan view of a main surface of one of the substrates, the liquid crystal display device has an alignment division pattern in which each pixel is divided into four or more alignment regions, and each set of a plurality of pixels constitutes one unit, and
each of the units of the alignment division pattern comprises, in at least one pixel, an alignment region whose alignment direction is different from alignment directions of alignment regions which are located at the same vertical and horizontal positions in the other pixels.

The following description is provided to illustrate the liquid crystal display device of the present invention with reference to schematic views showing the structure (e.g. pixels) of the liquid crystal display device.

The original visual angle directions of the liquid crystal display device in its intact state are shown in FIG. 1 and are changed, for example, as shown in FIG. 2 by pressing force. Although domains of each pixel are distorted in predetermined directions around the pressed point in the same manner as that in the conventional structure, the area ratio of domains of different viewing directions can be maintained substantially constant. Thus, this structure is excellent in uniformity of the visual angle directions, as described above. The black arrows in the figures indicate visual angle directions.

In the present invention, as described above, each pixel of each unit consisting of a plurality of pixels is preferably divided into alignment regions such that the area ratio of the domains can be maintained substantially constant even when external force is applied. In other words, preferred is a structure in which the pixels of each unit are divided into alignment regions such that the ratio of the total area of alignment regions of the same visual angle direction in the unit is maintained even when a certain level of external force is applied. For example, referring to FIG. 1, the total area of alignment regions having visual angle directions 1a, 2b, 3d and 4c which are downward to the right is referred to as the total area A, the total area of alignment regions having visual angle directions 1b, 2a, 3c and 4d which are downward to the left is referred to as the total area B, the total area of alignment regions having visual angle directions 1c, 2d, 3b and 4a which are upward to the left is referred to as the total area C, and the total area of alignment region having visual angle directions 1d, 2c, 3a and 4b which are upward to the right is referred to as the total area D. Referring to FIG. 2, the total area of alignment regions having visual angle directions 11a, 12b, 13d and 14c which are downward to the right is referred to as the total area A', the total area of alignment regions having visual angle directions 11b, 12a, 13c and 14d which are downward to the left is referred to as the total area B', the total area of alignment regions having visual angle directions 11c, 12d, 13b and 14a are upward to the left is referred to as the total area C', and the total area of alignment regions having visual angle directions 11d, 12c, 13a and 14b which are upward to the right is referred to as D'. The area ratios of A and A' are substantially the same, the area ratios of B and B' are substantially the same, the area ratios of C and C' are substantially the same, and the area ratios of D and D' are substantially the same.

In this example, the areas A, B, C and D are substantially the same, and the areas A', B', C' and D' are also substantially the same.

Additionally, in each unit consisting of a plurality of pixels, the visual angle directions of the alignment regions of each pixel are preferably determined based on an alignment division technique. For example, as show in FIGS. 1 and 2, the visual angle directions of the alignment regions of each pixel are preferably all different from one another. More preferred is a structure in which when a main surface of one of the substrates is viewed in a plan view, some of the visual angle directions are perpendicular or opposite to one another. This structure ensures better viewing angle characteristics.

The "alignment regions at the same vertical and horizontal positions" in pixels refer to alignment regions which are located at corresponding positions in the respective pixels when a main surface of one of the substrates is viewed in a plan view, and encompass alignment regions located at the same positions in the vertical and horizontal directions in the respective pixels among alignment regions of all the pixels. For example, in FIG. 1, the alignment regions having the visual angle directions 1a, 2a, 3a and 4a in the pixels 1, 2, 3 and 4 are located at the upper left positions in the respective pixels, that is, at the same vertical and horizontal positions. Likewise, the alignment regions having the visual angle directions 1b, 2b, 3b and 4b are located at the upper right positions, the alignment regions having the visual angle directions 1c, 2c, 3c and 4c are located at the lower right positions, and the alignment regions having the visual angle directions 1d, 2d, 3d and 4d are located at the lower left positions; thus these are sets of alignment regions at the same vertical and horizontal positions in the pixels. The number of alignment regions is preferably the same among the pixels but may be different. The alignment regions of each pixel preferably have the same area but may have different areas. In the case where the pixels differ in the number of alignment regions or the alignment regions differ in area, the pixels of each unit may be divided into alignment regions based on considerations of the position of the alignment regions in the vertical and horizontal directions in each pixel and the area of the alignment regions such that the area ratio of the domains is maintained substantially constant even when external force is applied.

In the present invention, each of the units of the alignment division pattern comprises, in at least one pixel, an alignment region whose alignment direction is different from alignment directions of alignment regions which are located at the same vertical and horizontal positions (alignment regions located at corresponding positions) in the other pixels. Generally, in the case that their alignment directions are different, their visual angle directions are also different.

In FIG. 1, the following groups are sets of alignment regions at the same vertical and horizontal positions in the respective pixels of the unit of the alignment division pattern: the alignment regions of 1a, 2a, 3a and 4a; the alignment regions of 1b, 2b, 3b and 4b; the alignment regions of 1c, 2c, 3c and 4c; and the alignment regions of 1d, 2d, 3d and 4d. For example, as for the alignment region of 1a in the pixel, at least one of the alignment regions of 2a, 3a and 4a located at the same positions in the other pixels has a different visual angle direction from the visual angle direction of the alignment region of 1a.

Additionally, in the present invention, it is preferable that all the alignment regions of one of the pixels in each unit of the alignment division pattern differ in alignment direction from the alignment regions at the same vertical and horizontal positions in the other pixels. FIG. 1 shows such a structure in which the visual angle direction 1a of the alignment region is different from all of the visual angle directions 2a, 3a and 4a of the other alignment regions, the visual angle direction 1b is different from all of the visual angle direction 2b, 3b and 4b, the visual angle direction 1c is different from all of the visual angle directions 2c, 3c and 4c, and the visual angle direction 1d is different from all of the visual angle directions 2d, 3d and 4d.

This structure is maintained also in FIG. 2 in which external pressure is applied.

The difference in alignment direction (visual angle direction) is preferably 90°, 180° or 270°. FIGS. 1 and 2 show such structures.

The sentence "each pixel is divided into four or more alignment regions" means that each pixel is divided into alignment regions of two or more different alignments and the total number of alignment regions in each pixel is four or more. Namely, all of the four or more alignment regions in each pixel may have a different alignment direction, or two or more of the alignment regions may have the same alignment direction provided that at least two alignment regions among them have a different alignment direction. In one preferable structure, each pixel is divided into alignment regions of four or more different alignment directions. More preferably, each pixel is divided into four alignment region (so-called four-domain structure), and particularly preferably, the alignment directions of the four alignment regions are all different.

In the liquid crystal display device of the present invention, a set of a plurality of pixels constitutes one unit, and typically, this unit is repeatedly arranged on the substrate of a display panel.

In a conventional example, the same pixels which are divided into regions of different alignments are arranged over a display region of a display panel; whereas in the present invention, the unit consisting of a plurality of pixels is arranged repeatedly over a display region of a display panel.

For example, in FIG. 1, one unit consists of four pixels, that is, a pixel 1, a pixel 2, a pixel 3 and a pixel 4 each of which is divided into alignment regions, and this unit is repeatedly arranged in the vertical and horizontal directions. The respective pixels are preferably located at the same positions in the respective units arranged in the repetitive pattern. Specifically, in the case that the unit consisting of the pixel 1, the pixel 2, the pixel 3 and the pixel 4 of FIG. 1 is repeatedly arranged, the pixel 1, the pixel 2, the pixel 3 and the pixel 4 are respectively located at the same vertical and horizontal positions in all the units when a main surface of a substrate is viewed in a plan view.

In one preferable structure of the present invention, the alignment regions of each pixel have the same aperture area and/or the same visible light transmittance. Typical pixel electrodes are non-linear elements or the like, and are not symmetric in the vertical and horizontal directions. Therefore, it is preferable to divide the aperture of each pixel electrode in the vertical and horizontal directions into regions having substantially the same area or to divide each pixel into four or more regions having substantially the same visible transmittance. A structure in which alignment regions have substantially the same aperture area and/or substantially the same visible light transmittance further improves the uniformity of visual angles.

The phrase "the same aperture area and/or the same visible light transmittance" means that the aperture areas and/or visible light transmittances of the alignment regions are at substantially the same levels which are generally considered to be the same in the technical field of liquid crystal display panels. It is preferred that the four or more divided regions have a different alignment direction from one another. In this case, each pixel may include two or more regions having the same alignment direction, provided that, when these regions are counted as one region, the number of regions having a different alignment direction is four or more.

Preferably, in the liquid crystal display device of the present invention, liquid crystal molecules are aligned vertically to the surfaces of the substrates when no voltage is applied. In such a vertical alignment mode, a liquid crystal having negative dielectric anisotropy is generally used. In this display mode, when a voltage lower than a threshold voltage is applied (e.g. no voltage is applied), the liquid crystal molecules are aligned substantially vertically to the surfaces of the substrates; when a voltage not lower than the threshold is applied, the liquid crystal molecules are tilted to be substantially horizontal to the surfaces of the substrates. The term "liquid crystal molecules having negative dielectric anisotropy" means liquid crystal molecules having a larger dielectric constant in the short axis direction than its dielectric constant in the long axis direction. In the case that the liquid crystal display device of the present invention is of a vertical alignment mode, a high contrast ratio is ensured. The term "vertical direction" refers to a substantially vertical direction which is generally considered as a vertical alignment mode in the technical field of liquid crystal display panels.

The liquid crystal display device of the present invention preferably further comprises an active matrix substrate comprising a thin film transistor. This structure strengthens the ability to control the liquid crystal alignment, resulting in improved display quality. In this case, substrates are generally provided thereon with electrodes such as gate electrodes connected to gate lines (scan lines); source electrodes connected to source lines (signal lines); a drain electrode connected to pixel electrodes; and a storage capacitor electrode. Typically, the liquid crystal display device has a pixel electrode structure in which the gate lines and the source lines intersect each other, thin film transistors (hereinafter, also referred to as TFTs), which serve as switching elements, and pixel electrodes are provided at the intersections, the TFTs respectively comprise the gate electrodes connected to the gate lines, the source electrodes facing the gate electrodes with a predetermined distance therebetween and connected to the source lines, the drain electrode connected to pixel electrodes and an island-shaped semiconductor layer.

The liquid crystal display device of the present invention is configured such that each pixel is divided into four or more alignment regions, as described above, and that each set of a plurality of pixels constitutes one unit of the alignment division pattern. Additionally, the liquid crystal display device of the present invention is further provided with other components such as those commonly used in liquid crystal display panels and liquid crystal display devices in addition to those constituting the essential structure where each of the units of the alignment division pattern comprises, in at least one pixel, an alignment region whose alignment direction is different from alignment directions of alignment regions which are located at same vertical and horizontal positions in the other pixels and the above-mentioned preferable structures. These other components are not particularly limited.

The above-mentioned structures may be optionally combined within the scope of the present invention.

Advantageous Effects of Invention

The present invention provides a liquid crystal display device with an alignment division pattern which satisfies a wide viewing angle and is excellent in display quality and uniformity of visual angles even when divided alignment regions are distorted due to an external stress such as pressing force.

DESCRIPTION OF EMBODIMENTS

In the following embodiments, a substrate provided with a thin film transistor element (TFT) is also referred to as a TFT substrate or a TFT array substrate.

In the following embodiments, a substrate provided with a color filter (CF) is also referred to as a CF substrate. The difference between alignment directions herein is expressed as the angle (°) by which one of the alignment directions is rotated clockwise to coincide with the other alignment direction.

The following description is offered to illustrate the present invention in more detail by way of embodiments with reference to the drawings. The present invention, however, is not limited only to these embodiments.

Embodiment 1

Figure 1:
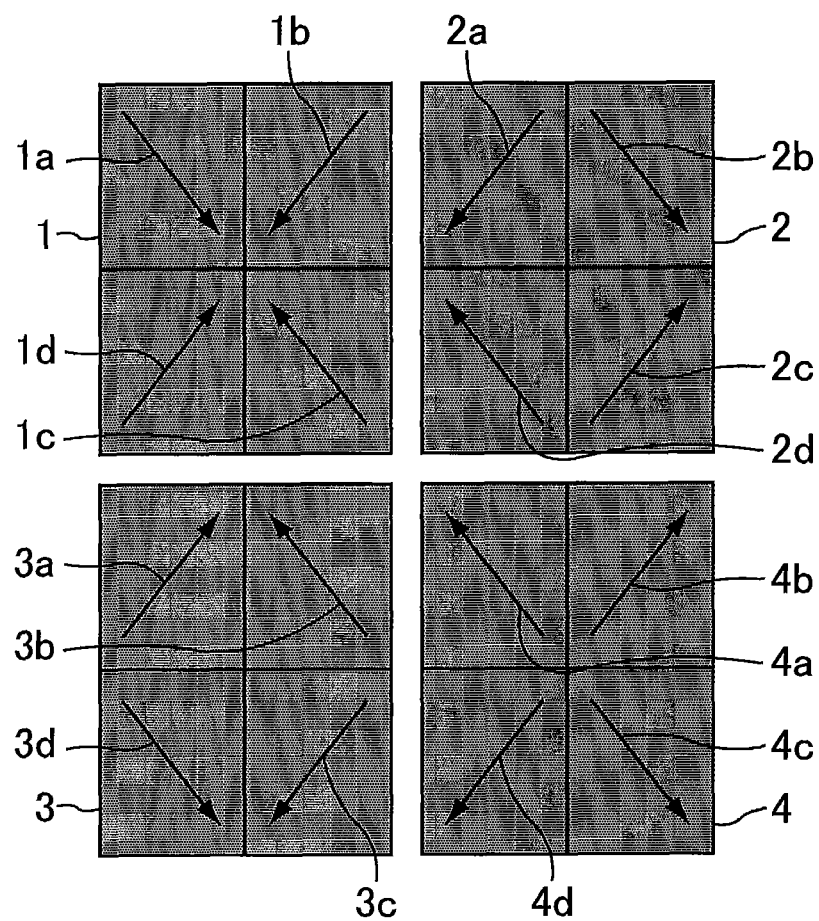
FIG. 1 is a plan view schematically showing pixels of a liquid crystal display device of embodiment 1.
Figure 2:
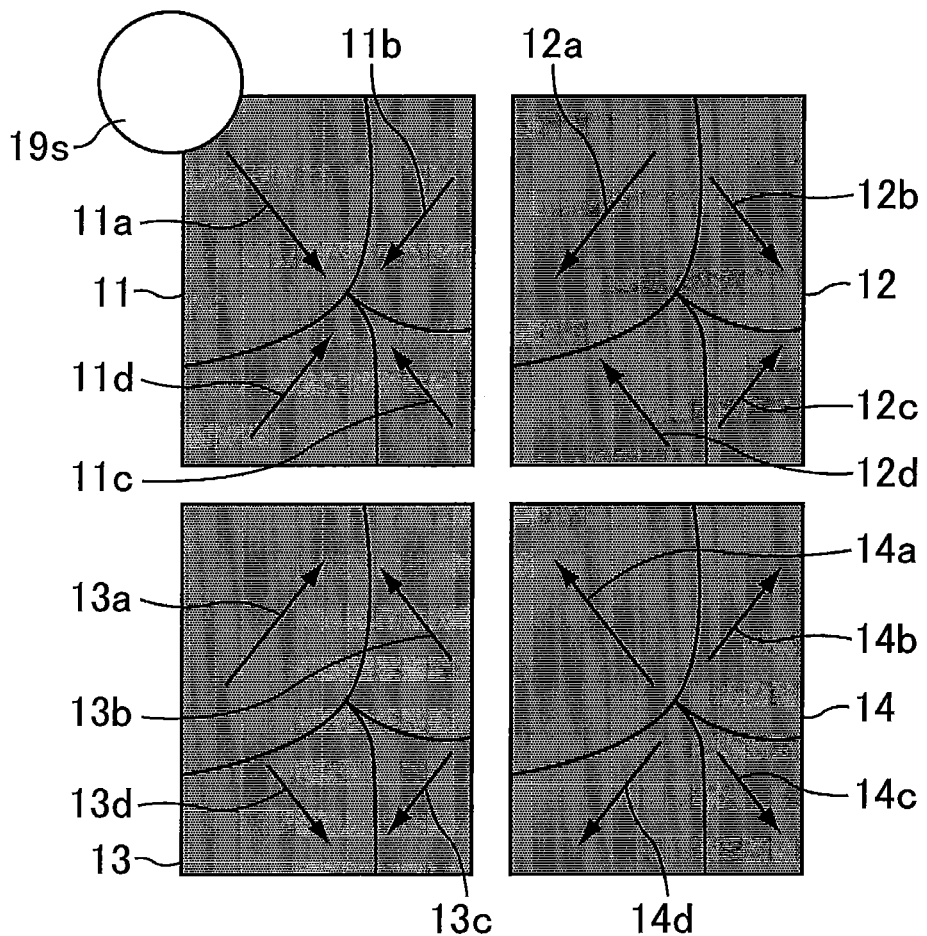
FIG. 2 is a plan view schematically showing the pixels of the liquid crystal display device of embodiment 1.

FIGS. 1 and 2 are plan views schematically showing pixels of a liquid crystal display device of embodiment 1. FIGS. 1 and 2 show one unit of an alignment division pattern in which each unit consists of four pixels 1 to 4.

FIG. 1 shows the visual angle directions 1a to 1d, 2a to 2d, 3a to 3d, and 4a to 4d of the alignment regions (domains) in the pixels 1 to 4 to which no external stress (e.g. pressing force) is being applied. In embodiment 1, the pixels are substantially square-shaped. Typical pixel electrodes are not symmetric in the vertical and horizontal directions because there are non-linear elements or the like. Therefore, it is preferable to divide the aperture of each pixel electrode in the vertical and horizontal directions into regions having substantially the same area or to divide each pixel into four regions having substantially the same visible transmittance. In other words, the pixels are preferably designed such that the alignment regions of the pixels have substantially the same aperture area and substantially the same visible light transmittance.

In FIG. 1, the following groups are sets of alignment regions located at the same vertical and horizontal positions in the respective pixels of the unit of the alignment division pattern: the alignment regions of 1a, 2a, 3a and 4a; the alignment regions of 1b, 2b, 3b and 4b; the alignment regions of 1c, 2c, 3c and 4c; and the alignment regions of 1d, 2d, 3d and 4d. Embodiment 1 is considered to satisfy the structure in which the alignment directions of all the alignment regions of one pixel in one unit of the alignment division pattern are different from the alignment directions of the corresponding alignment regions located at the same positions in the other pixels, provided that one alignment region in one pixel is the alignment region of 1a and the alignment regions which are located at same vertical and horizontal positions in the other pixels are the alignment regions of 2a, 3a and 4a among the regions. Specifically, as shown in FIG. 1, the visual angle direction 1a of the alignment region is different from all of the visual angle directions 2a, 3a and 4a of the alignment regions, the visual angle direction 1b is different from all of the visual angle directions 2b, 3b and 4b, the visual angle direction 1c is different from all of the visual angle directions 2c, 3c and 4c, and the visual angle direction 1d is different from all of the visual angle directions 2d, 3d and 4d.

FIG. 2 shows the visual angle directions 11a to 11d, 12a to 12d, 13a to 13d, 14a to 14d of the alignment regions of the pixels 11 to 14 to which an external stress 19s, such as pressing force, is applied at the upper left position.

In embodiment 1, even when the divided alignment regions are distorted due to an external stress such as pressing force, the units each consisting of a plurality of pixels can maintain the uniformity of the visual angles. For example, in the upper left pixel in FIG. 2, the alignment region of the visual angle direction 11a (the visual angle direction is downward to the right) is enlarged, resulting in contraction of the alignment region of the visual angle direction 11c (the visual angle direction is upward to the left). On the other hand, in the lower right pixel in FIG. 2, the alignment region of the visual angle direction 14a (the visual angle direction is upward to the left) is enlarged, resulting in contraction of the alignment region of the visual angle direction 14c (the visual angle direction is downward to the right). Thus, the change in the alignment regions in the upper left pixel is compensated. Consequently, the total areas of the alignment regions of the respective visual angle directions are maintained substantially constant in each unit consisting of a plurality of pixels. Therefore, it is possible to produce images without any large effect on the display quality from any viewpoint.

It should be noted that conventional liquid crystal display devices can recover to their original stable state from such a distorted state of alignment regions only after long-term passage, or by cutting the power supply or displaying a black image.

Figure 3:
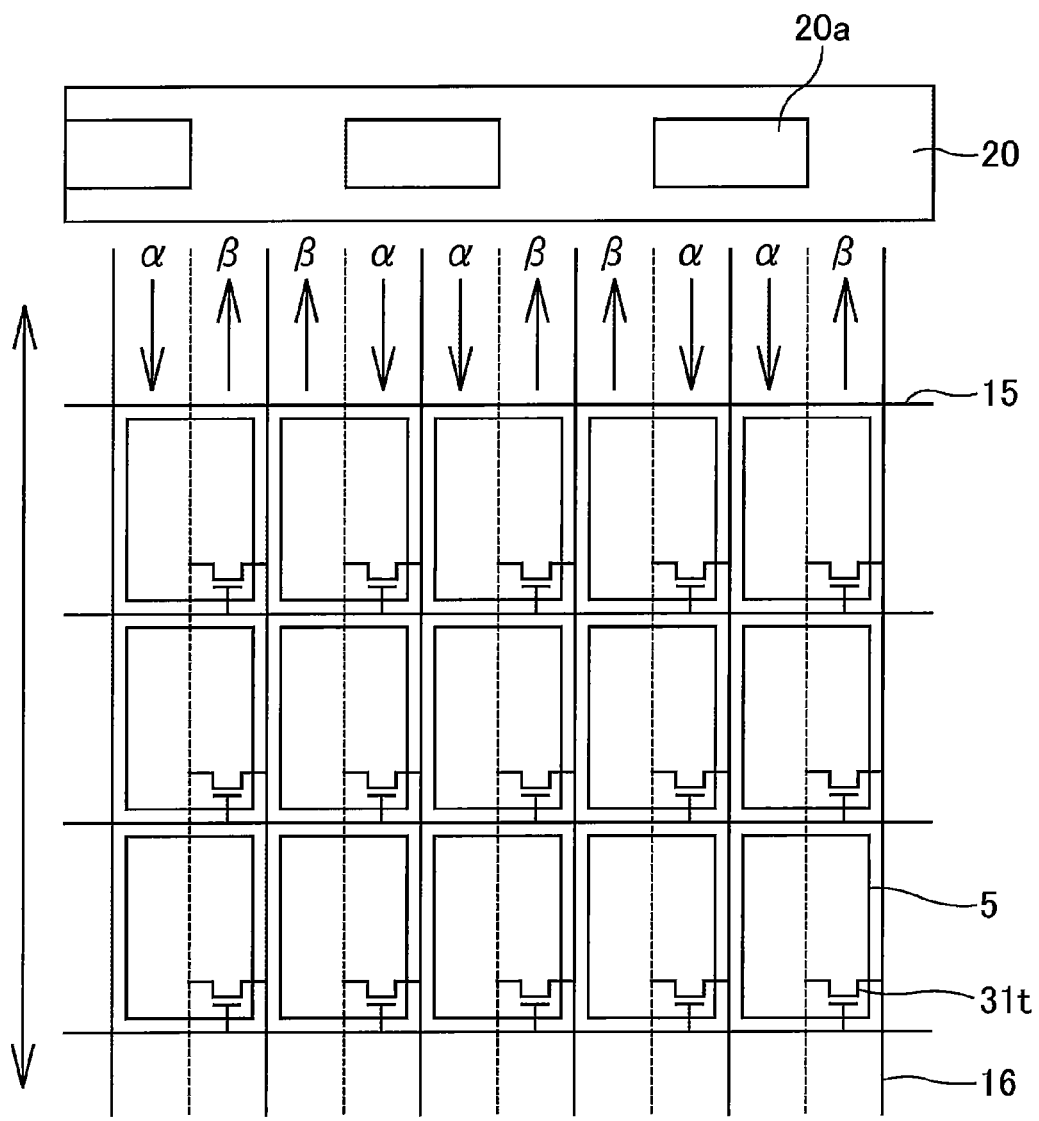
FIG. 3 is a schematic view showing a production process of the liquid crystal display device of embodiment 1.

FIG. 3 is a schematic view showing a production process of the liquid crystal display device of embodiment 1.

In FIG. 3, α indicates a downward alignment direction, and β indicates an upward alignment direction. In embodiment 1, the pattern of the alignment directions αββααβ for semi-pixels is determined as a repeating unit based on a consideration of the relationship with the pixel electrodes instead of the conventional pattern of αβαβαβ for semi-pixels. Specifically, as shown in FIG. 3, the width of openings 20a of a mask 20 is twice as large as a conventional width (half-length of one side of each pixel) (i.e. the width is the same as the length of a side of each pixel, and corresponds to the length of a short side of each pixel in FIG. 3), and the center lines of the pixels (dot lines passing through the middle points of the short sides of the pixels in FIG. 3) coincide with the boundaries of exposed parts and unexposed parts.

FIG. 3 shows a display region of a circuit substrate in which gate lines 15 and source lines 16 are substantially perpendicular to each other on a glass substrate (not shown), and each of regions defined by the gate lines 15 the source lines 16 is provided with a pixel 5 (pixel electrode) and a TFT 31t.

Currently, use of photoalignment technology is the most practical way for slightly tilting liquid crystal molecules which are aligned vertically in a predetermined direction, and provides excellent display quality. In this method, scanning is performed in the directions of the double headed arrow in FIG. 3 with UV light polarized with a mask so as to expose each region to the light. As a result, the tilt direction of the liquid crystal molecules in each region can be suitably controlled to a predetermined direction. In order to slightly tilt the liquid crystal molecules in a predetermined direction, methods such as mask rubbing and ion beam radiation can also be used. Although in the structure shown in FIG. 3, the alignment film on the TFT array substrate is divided into regions of different alignments, the alignment film on the color filter substrate may be likewise divided into regions of different alignments by photoalignment technology. In general, in the TN mode, the alignment film on the TFT array substrate and the alignment film on the CF substrate form two or more regions of different alignment directions in each pixel. More preferably, any one of the two or more alignment directions is substantially perpendicular to one of the others.

One preferable example of methods for producing a liquid crystal display device having the alignment division pattern of embodiment 1 is a method for producing a liquid crystal display device comprising a pair of a substrate (a pixel substrate (e.g. a TFT array substrate) and a counter substrate (e.g. a CF substrate) facing the pixel substrate); a liquid crystal layer provided between the substrates; a first alignment film provided on the liquid crystal layer side surface of the pixel substrate; and a second alignment film provided on the liquid crystal layer side surface of the counter substrate, wherein the production method comprises subjecting the first alignment film and/or the second alignment film to scanning exposure continuously over a plurality of pixels, the scanning exposure comprising exposing the first alignment film and/or the second alignment film while scanning an inside of each pixel more than one time in antiparallel directions to form, in the each pixel region, regions in which liquid crystal molecules are aligned in antiparallel directions to the surface(s) of the first alignment film and/or the second alignment film. In embodiment 1, the method for producing a liquid crystal display device preferably comprises exposing and attaching the first substrate and the second substrate such that the direction of the scanning exposure for the first alignment film and the direction of the scanning exposure for the second alignment film are substantially perpendicular to each other.

Thus, embodiment 1 relates to a liquid crystal display device comprising two substrates and a liquid crystal between the substrates, at least one of the substrates being provided with an active matrix element array. The liquid crystal material has negative dielectric anisotropy, and is a nematic layer within a predetermined temperature range. This liquid crystal material is, as described above, aligned substantially vertically to the substrates but slightly tilted to a predetermined direction which differs among regions, when no voltage is applied.

Figure 4:
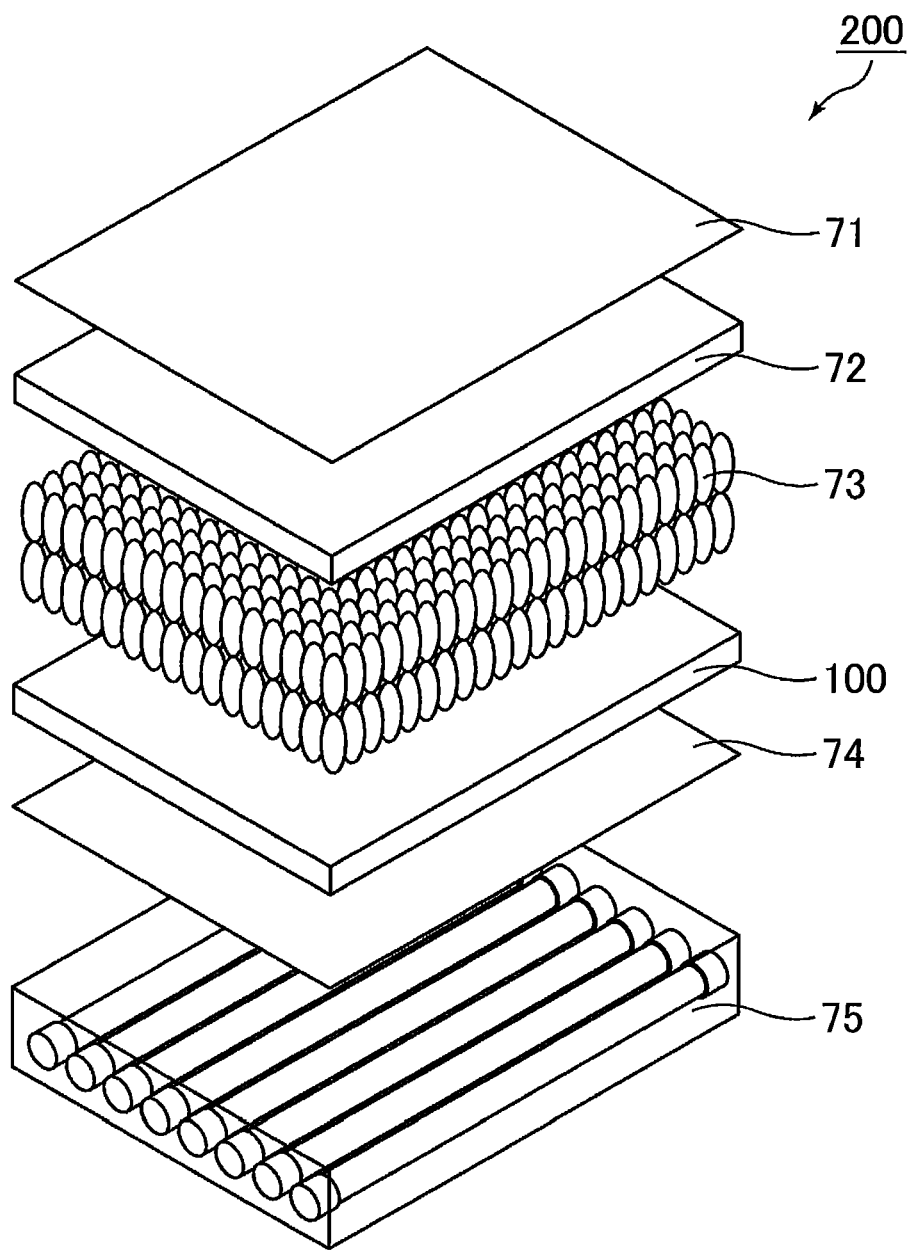
FIG. 4 is an exploded perspective view showing a liquid crystal display panel and a back light unit of the liquid crystal display device of embodiment 1.

FIG. 4 is an exploded perspective view showing a liquid crystal display panel and a back light unit of the liquid crystal display device of embodiment 1. As shown in FIG. 4, a CF side substrate 72 and a circuit substrate 100 are provided on the both sides of a liquid crystal 73 in a liquid crystal panel 200. The pixels of each of the CF side substrate 72 and the circuit substrate 100 are, as described above, divided into regions of different alignments when a surface thereof is viewed in a plan view. Additionally, the liquid crystal panel 200 is provided with a back light unit 113 on the back side of the circuit substrate 100. Light from the back light unit 113 passes through a polarizer 74, the circuit substrate 100, the liquid crystal 73, the CF side substrate 72, and a polarizer 71 in this order, and is allowed to pass or blocked by alignment control of the liquid crystal.

Figure 5:
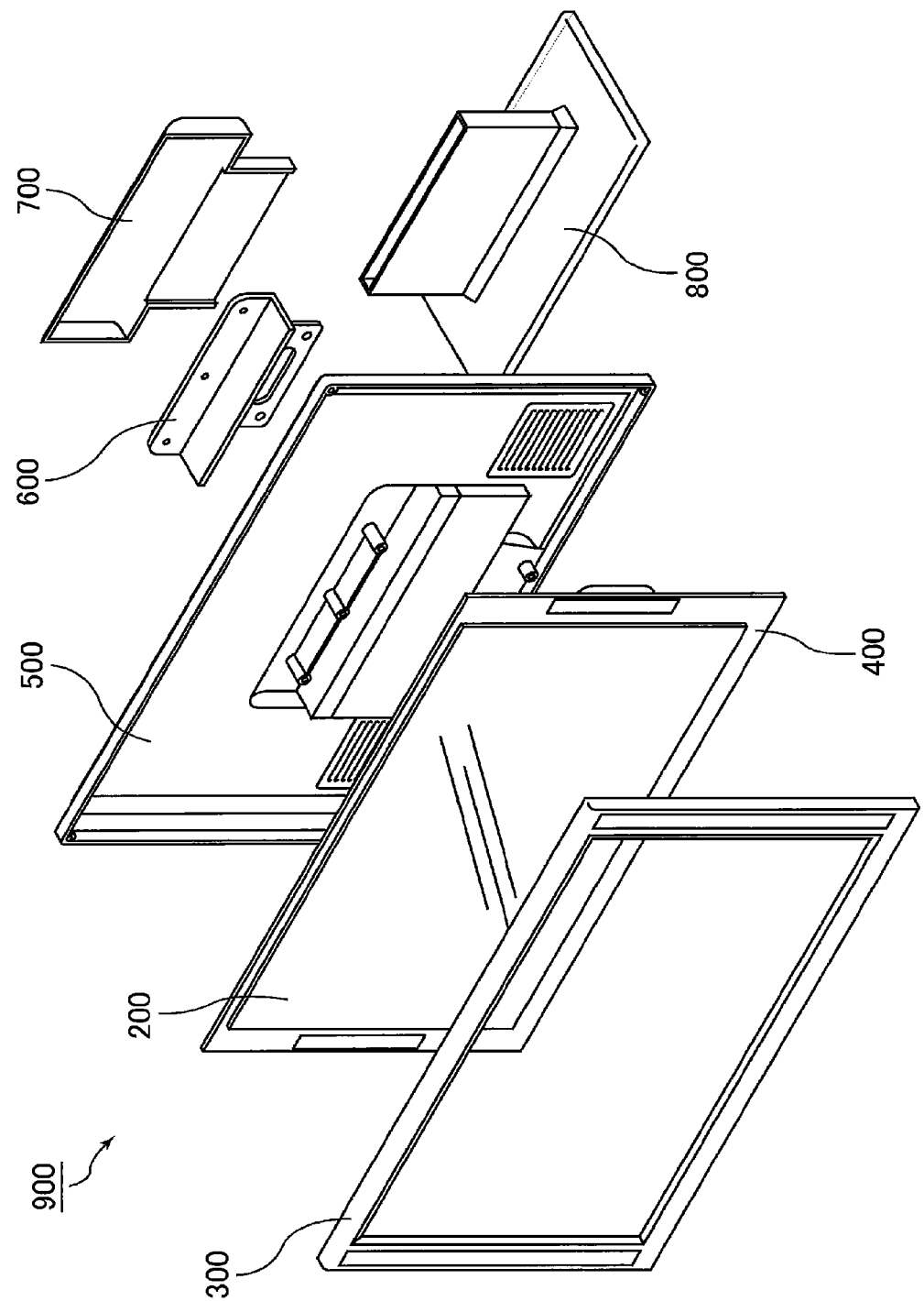
FIG. 5 is an exploded perspective view showing the liquid crystal display device of embodiment 1.

FIG. 5 is an exploded perspective view showing the liquid crystal display device of embodiment 1.

Specifically, FIG. 5 is an exploded perspective view showing the structure of a liquid crystal display device 900 including the liquid crystal panel shown in FIG. 4 and the back light unit (not shown). As shown in FIG. 5, the liquid crystal panel 200 is fixed on a fixing panel 400, and enclosed with a front cabinet 300 and a back cabinet 500. The back cabinet 500 and an upper stand 700 are fixed to each other with a metal fitting 600. The upper stand 700 is engaged with a lower stand 800.

Embodiment 2

Figure 6:
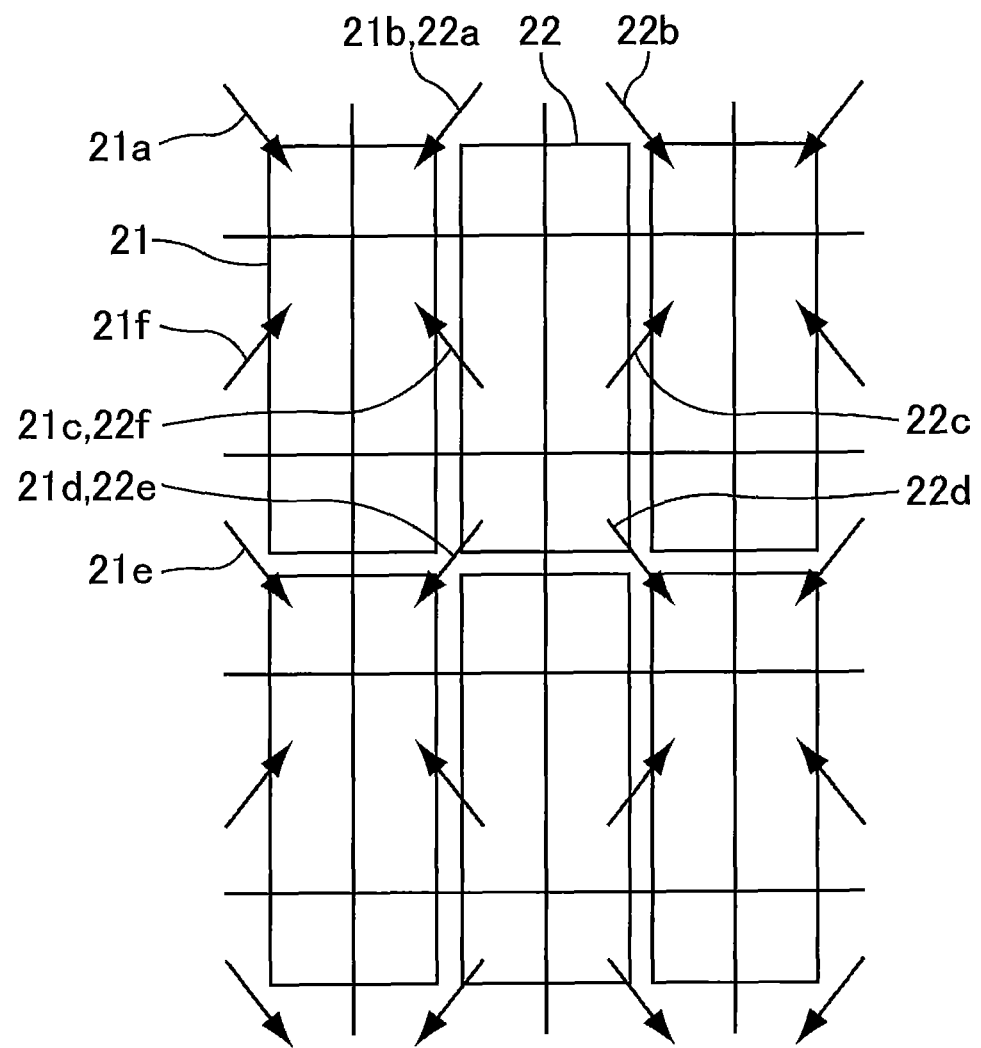
FIG. 6 is a plan view schematically showing pixels of a liquid crystal display device of embodiment 2.

FIG. 6 is a plan view schematically showing pixels of a liquid crystal display device of embodiment 2. In the alignment division pattern shown in FIG. 6, two pixels 21 and 22 constitute one unit.

The arrows in FIG. 6 indicate the visual angle directions of the alignment regions in the pixels to which no external stress, such as pressing force, is being applied. In FIG. 6, the arrow which indicates the visual angle direction of the alignment region at the upper right position in the pixel 21 also indicates the visual angle direction of the alignment region at the upper left position in the pixel 22. Referring to the alignment region in the pixel 21, reference number 21*b* is used for the arrow; whereas referring to the alignment region in the pixel 22, reference number 22*a* is used for the arrow. These are assigned to essentially the same alignment direction of the alignment regions. The same applies to reference numbers 21*c* and 22*f*, and 21*d* and 22*e*.

In the liquid crystal display device of embodiment 2, each pixel electrode is rectangular and each three (e.g. RGB) of the pixel electrodes constitute a square as seen in a structure practically used in a color liquid crystal display device. Thus, in embodiment 2, the pixels correspond to subpixels of a color liquid crystal display device each of which is assigned for one color. In this case, for example, the alignment division pattern shown in FIG. 6 is acceptable, and as also described above in embodiment 1, it is preferable to divide the aperture of each pixel electrode in the vertical and horizontal directions into regions having substantially the same area or divide each pixel into four regions (four regions of different alignment directions, e.g. the combined region of the regions of 21*a* and 21*e*, the combined region of the regions of 21*b* and 21*d*, the region of 21*c* and the region of 21*f* in the pixel 21) having substantially the same visible transmittance.

Additionally, this structure can produce the desired effect at substantially the same level even when only one of colors such as RGB is displayed.

In FIG. 6, the following pairs are located at the same vertical and horizontal positions in the pixels: the alignment regions having the visual angle directions 21*a* and 22*a* are located at the upper left positions in the pixels; the alignment regions having the visual angle directions 21*b* and 22*b* are located at the upper right positions in the pixels; the alignment regions having the visual angle direction 21*c* and 22*c* are located at the right middle position in the pixels; the alignment regions having the visual angle directions 21*d* and 22*d* are located at the lower right positions in the pixels; the alignment regions having the visual angle directions 21*e* and 22*e* are located at the lower left positions in the pixels; and the alignment regions having the visual angle directions 21*f* and 22*f* are located at the middle left positions in pixels. Regarding the alignment region of 21*a* in the pixel among these, the alignment region 22*a* is one that is located at the same vertical and horizontal position in the other pixel. In the two pixels (the pixels 21 and 22) which constitute one unit of the alignment division pattern of embodiment 1, as shown in FIG. 1, the visual angle direction 22*a* of the alignment region at the upper left position in the pixel is different by 90° from the visual angle direction 21*a* of the alignment region at the same vertical and horizontal position. Likewise, the visual angle direction 22*b* of the alignment region at the upper right position in the pixel is different by 270° from the visual angle direction 21*b* of the alignment region at the same vertical and horizontal position (the visual angle direction 21*b* of the alignment region is different by 90° from the visual angle direction 22*b* of the alignment region). Additionally, the visual angle direction 22*c* of the alignment region at the middle right position in the pixel is different by 90° from the visual angle direction 21*c* of the alignment region at the same vertical and horizontal position. Furthermore, the visual angle direction 22*d* of the alignment region at the lower right position in the pixel is different by 270° from the visual angle direction 21*d* of the alignment region at the same vertical and horizontal position (the visual angle direction 21*d* of the alignment region is different by 90° from the visual angle direction 22*d* of the alignment region). Also, the visual angle 22*e* of the alignment region at the lower left position in the pixel is different by 90° from the visual angle direction 21*e* of the alignment region at the same vertical and horizontal position. Additionally, the visual angle direction 22*f* of the alignment region at the middle left position in the pixel is different by 270° from the visual angle direction 21*f* of the alignment region at the same vertical and horizontal position (the visual angle direction 21*f* of the alignment region is different by 90° from the visual angle direction 22*f* of the alignment region). Namely, the alignment directions of all the alignment regions in one pixel are different by 90° or 270° from the alignment directions of the alignment regions at the same vertical and horizontal positions in other pixels. This structure is one of particularly preferable structures.

In embodiment 2, when an external stress is applied at an upper left position in FIG. 6, the alignment region having the visual angle direction 21*a* (the visual angle direction is downward to the right) in the pixel 21 is enlarged, resulting in contraction of the alignment region having the visual angle direction 21*b* (the visual angle direction is downward to the left); whereas, the alignment region having the visual angle direction 22*a* (the visual angle direction is downward to the left) in the pixel 22 is enlarged, resulting in contraction of the alignment region having the visual angle direction 22*b* (the visual angle direction is downward to the right). Consequently, the area ratio of the alignment regions having the visual angle direction downward to the left and the alignment regions having the visual angle direction downward to the right among the alignment regions of 21*a*, 21*b* (22*a*), and 22*b* is maintained substantially at 1:1. On the other hand, as a result of the increase in the total areas of the above-mentioned alignment regions, the areas of the alignment regions of the visual angle direction downward to the left and the alignment regions of the visual angle direction downward to the right increase with respect to those of the alignment regions of the other visual angle directions. To compensate this, the total area of the alignment region having the visual angle direction 21*e* (the visual angle direction is downward to the right) and the alignment region having the visual angle direction 21*d* (the visual angle direction is downward to the left) in the pixel 21 and the alignment region having the visual angle direction 22*e* (the visual angle direction is downward to the left) and the alignment region having the visual angle direction 22*d* (the visual angle direction is downward to the right) in the pixel 22 is reduced. Consequently, the total areas of the alignment regions having the respective visual angle directions in one unit of the alignment division pattern are maintained substantially constant. Therefore, it is possible to produce images without any large effect on the display quality from any viewpoint.

The same method as the method for producing a liquid crystal display device having the alignment division pattern of embodiment 1 can be used to produce a liquid crystal display device having the alignment division pattern of embodiment 2.

Embodiment 3

Figure 7:
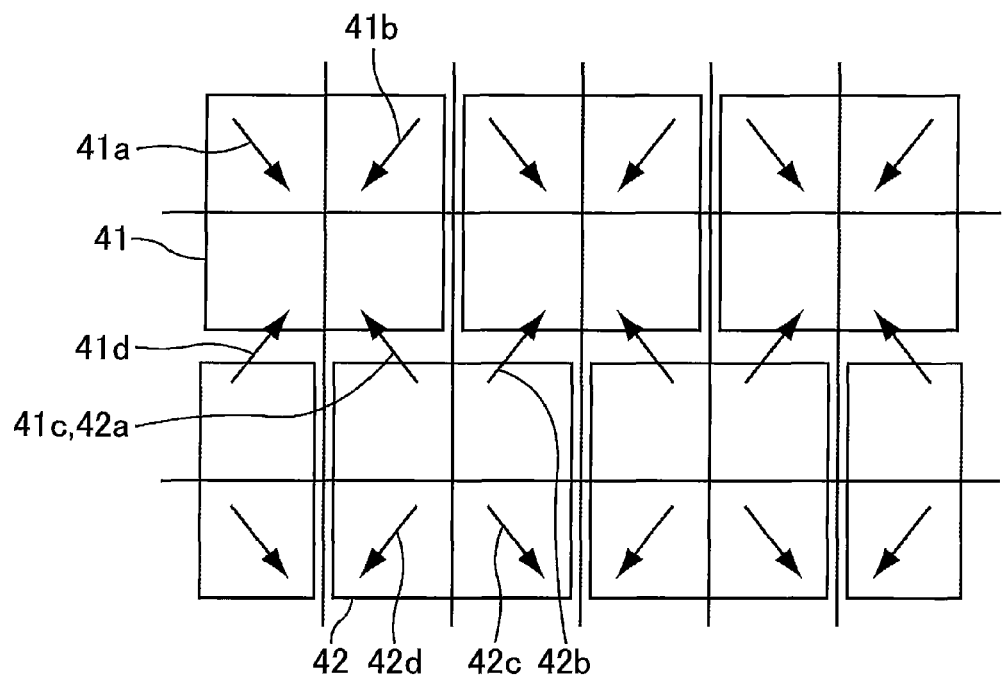
FIG. 7 is a plan view schematically showing pixels of a liquid crystal display device of embodiment 3.
Figure 8:
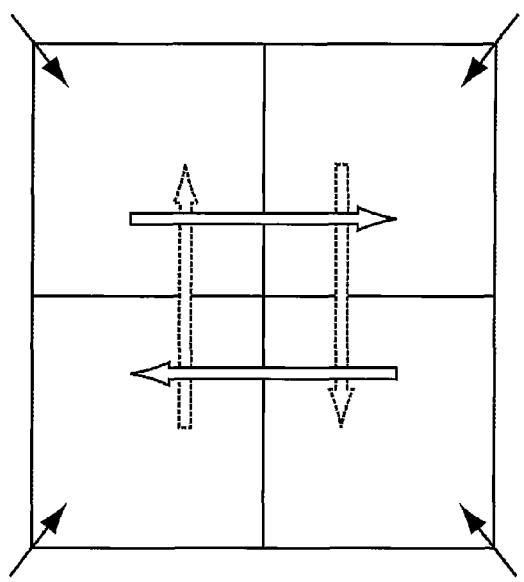
FIG. 8 is a plan view schematically showing pixels of a conventional liquid crystal display device.
Figure 9:
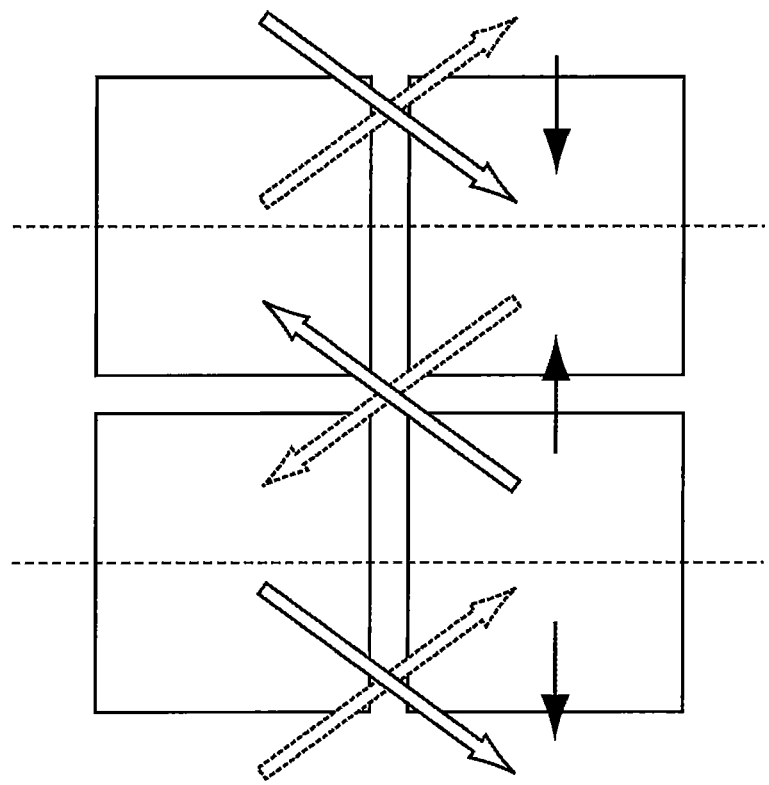
FIG. 9 is a plan view schematically showing pixels of a conventional liquid crystal display device.
Figure 10:
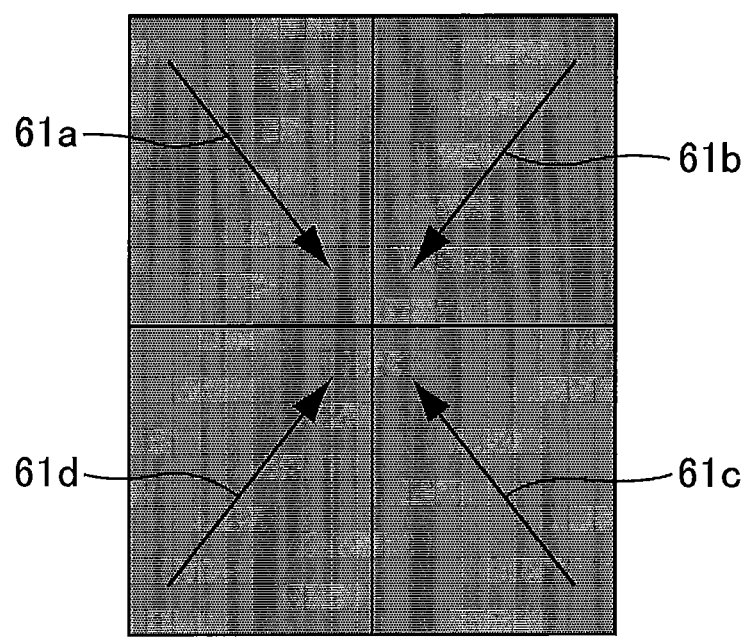
FIG. 10 is a plan view schematically showing pixels of a conventional liquid crystal display device.
Figure 11:
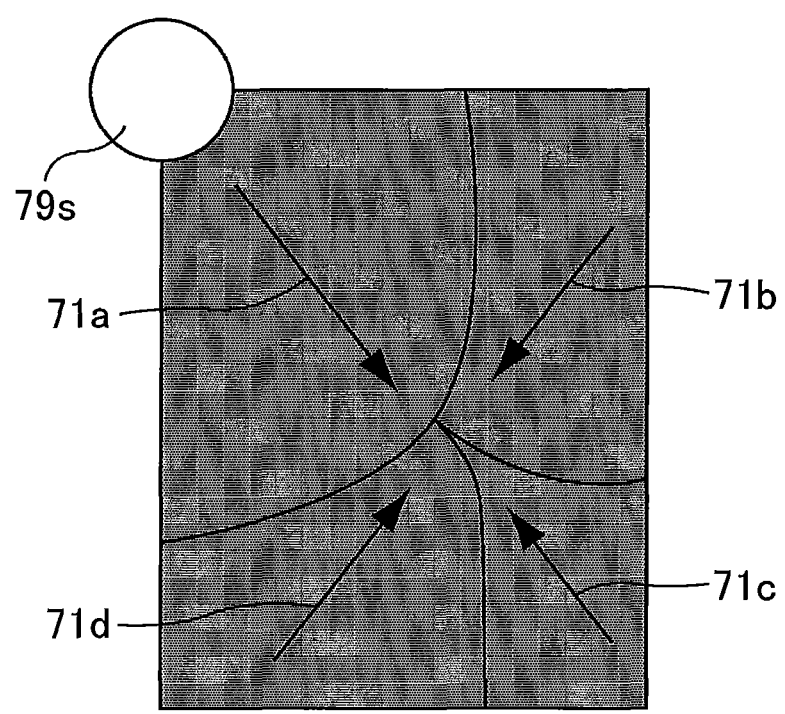
FIG. 11 is a plan view schematically showing pixels of a conventional liquid crystal display device.

FIG. 7 is a plan view schematically showing pixels of a liquid crystal display device of embodiment 3. In the alignment division pattern of FIG. 7, for example, two pixels 41 and 42 constitute one unit.

FIG. 7 shows the visual angle directions 41*a* to 41*d*, 42*a* to 42*d*, 43*a* to 43*d*, and 44*a* to 44*d* of the alignment regions in the pixels 41 and 42 to which no external stress, such as pressing force, is being applied. FIG. 7 shows one example of an alignment division pattern in a delta array of pixels which is used mainly for digital still cameras or the like.

Also in the structure shown in FIG. 7, as seen in the pixels shown in FIG. 1, the areas of the alignment regions in the pixels are maintained substantially constant even when an external stress such as pressing force is applied. Therefore, it is possible to produce images without any large effect on the display quality from any viewpoint.

Also, in embodiment 3, it is preferable to divide the pixels into regions having the same aperture area and the same visible light transmittance.

Regarding the unit of the alignment division pattern shown in FIG. 7, the following pairs are located at the same vertical and horizontal positions in the pixels: the alignment regions of 41*a* and 42*a*; the alignment regions of 41*b* and 42*b*; the alignment regions of 41*c* and 42*c*; and the alignment regions of 41*d* and 42*d*. Embodiment 3 is considered to satisfy the structure in which the alignment directions of all the alignment regions of one pixel in one unit of the alignment division pattern are different from the alignment directions of the corresponding alignment regions located at the same positions in the other pixel, provided that one alignment region in one pixel is the alignment region of 41*a* and the alignment region which is located at same vertical and horizontal position in the other pixel is the alignment region of 42*a*. Specifically, as shown in FIG. 7, the visual angle direction of the alignment region 42*a* is different by 180° from the visual angle direction of the alignment region 41*a*, and likewise, the visual angle directions 42*b*, 42*c*, and 42*d* of the alignment regions are different by 180° from the visual angle directions 41*b*, 41*c*, and 41*d* of the alignment regions. This structure is also one of particularly preferable structures. In FIG. 7, reference number 41*c*, which indicates the visual angle direction of the pixel 41, also indicates the visual angle direction of the pixel 42. Although when referring to the visual angle direction of the pixel 42, reference number 42*a* is used, these are assigned to the same alignment direction of the alignment regions.

In embodiment 3, when an external stress such as pressing force is applied at an upper left position of the upper left pixel 41 in FIG. 7, the alignment region having the visual angle direction 41*a* (the visual angle direction is downward to the right) is enlarged, resulting in contraction of the alignment region having the visual angle direction 41*c* (the visual angle direction is upward to the left) in the upper left pixel 41; whereas the alignment region having the visual angle direction 42*a* (the visual angle direction is upward to the left) is enlarged, resulting in contraction of the alignment region having the visual angle direction 42*c* (the visual angle direction is downward to the right) in the other pixel 42 in the same unit. Consequently, the areas of the alignment regions in the unit consisting of the pixels 41 and 42 are maintained substantially constant. Therefore, it is possible to produce images without any large effect on the display quality from any viewpoint.

The same method as the method for producing a liquid crystal display device having the alignment division pattern of embodiment 1 can be used to produce a liquid crystal display device having the alignment division pattern of embodiment 3.

Any of the structures described in the embodiments above may be used in combination within the scope of the present invention.

The present application claims priority to Patent Application No. 2010-109600 filed in Japan on May 11, 2010 under the Paris Convention and provisions of national law in a designated State, the entire contents of which are hereby incorporated by reference.

REFERENCE SIGNS LIST 1a to 1d, 2a to 2d, 3a to 3d, 4a to 4d, 11a to 11d, 12a to 12d, 13a to 13d, 14a to 14d, 21a to 21f, 22a, 22b, 22d, 22e, 41a to 41d, 61a to 61d, 71a to 71d: Viewing angle direction
1 to 5, 11 to 14, 21, 22, 41: Pixel
19s, 79s: External stress
15: Gate line
16: Source line
20: Photomask
20a: Aperture
31t: TFT
71, 74: Polarizer
72: CF side substrate
73: Liquid crystal
75: Back light unit
100: Circuit substrate
200: Liquid crystal panel
300: Front cabinet
400: Fixing panel
500: Back cabinet
600: Metal fitting
700: Upper stand
800: Lower stand
900: Liquid crystal display device

The invention claimed is:

1. A liquid crystal display device comprising:
a pair of substrates; and
a liquid crystal layer between the substrates,
wherein the liquid crystal layer includes liquid crystal molecules having negative dielectric anisotropy,
when no voltage is applied to the liquid crystal layer, the liquid crystal molecules are aligned substantially vertically to surfaces of the substrates and being slightly tilted to a first alignment direction, a second alignment direction which is different by approximately 90° from the first alignment direction, a third alignment direction which is different by approximately 180° from the first alignment direction, or a fourth alignment direction which is different by approximately 270° from the first alignment direction,
wherein the liquid crystal display device comprises a first pixel and a second pixel adjacent to the first pixel,
each of the first pixel and the second pixel is divided into four or more alignment regions as viewed in a plan view of a main surface of one of the substrates,
wherein of the four or more alignment regions include a first alignment region in which the liquid crystal molecules are tilted to the first alignment direction, a second alignment region in which the liquid crystal molecules are tilted to the second alignment direction, a third alignment region in which the liquid crystal molecules are tilted to the third alignment direction, and a fourth alignment region in which the liquid crystal molecules are tilted to the fourth alignment direction,
the first pixel includes a first unit,
the second pixel includes a second unit which is located at same vertical and horizontal position as the first unit, and a third unit which is located at symmetric position of the first unit with respect to a border between the first pixel and the second pixel,
an alignment direction of the first unit is different from an alignment direction of the second unit, and
the alignment direction of the first unit is same as an alignment direction of the third unit.

2. The display device according to claim 1, wherein the four or more alignment regions have the same aperture area and/or the same visible light transmittance.

3. The display device according to claim 1, wherein all the four or more alignment regions in the first pixel differs in alignment direction from the alignment regions at the same vertical and horizontal positions in the second pixel.

4. The display device according to claim 1, comprising an active matrix substrate comprising a thin film transistor.

5. The display device according to claim 1, wherein alignment directions of said four or more alignment regions are perpendicular or opposite to one another.

* * * * *